United States Patent [19]

O'Meara

[11] 3,764,213
[45] Oct. 9, 1973

[54] RETURN-WAVE, PHASE CONTROLLED ADAPTIVE ARRAY

[75] Inventor: Thomas R. O'Meara, Malibu, Calif.

[73] Assignee: Hughes Aircraft Company, Culver City Calif.

[22] Filed: May 8, 1972

[21] Appl. No.: 251,487

[52] U.S. Cl..................... 356/5, 250/204, 332/7.51, 250/199
[51] Int. Cl................................................ G01c 3/08
[58] Field of Search.................... 250/199, 201, 204; 350/162 SF; 332/7.51; 356/4, 5

[56] References Cited
UNITED STATES PATENTS
3,691,483  9/1972  Klein.................................. 332/7.51

Primary Examiner—Benjamin A. Borchelt
Assistant Examiner—S. C. Buczinski
Attorney—W. H. MacAllister, Jr. et al.

[57] ABSTRACT

In accordance with one embodiment of the invention received energy from selected subapertures of an energy transmission and reception system is spatial modulated with respect to an image plane stop structure so as to produce at the output of a detector disposed behind an aperture of the image plane stop structure, modulation components indicative of the relative phase relationship associated with each subaperture receiving path. The modulation components are applied to control variable phase shifters, in common transmission and reception paths of the selected subaperture channels, in such a manner that the optical intensity of the image field transmitted through the stop structure is maximized — that is the received image is centered on the stop aperture and the image spread is reduced to the minimum. The transmitted energy, which is applied through the phase shifters adjusted with respect to the phase relationship sensed from the received signals, is thereby correctly phased to cause maximum energy to be applied to the target.

20 Claims, 7 Drawing Figures

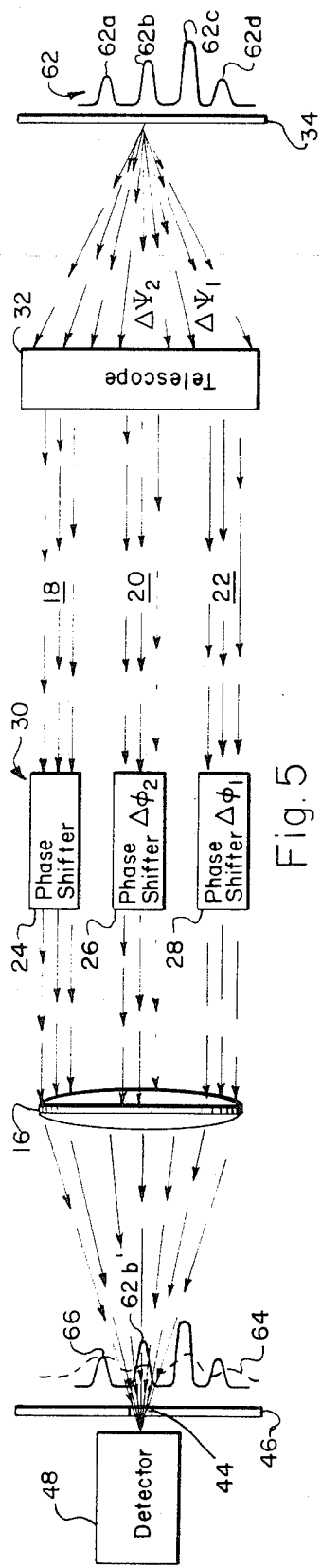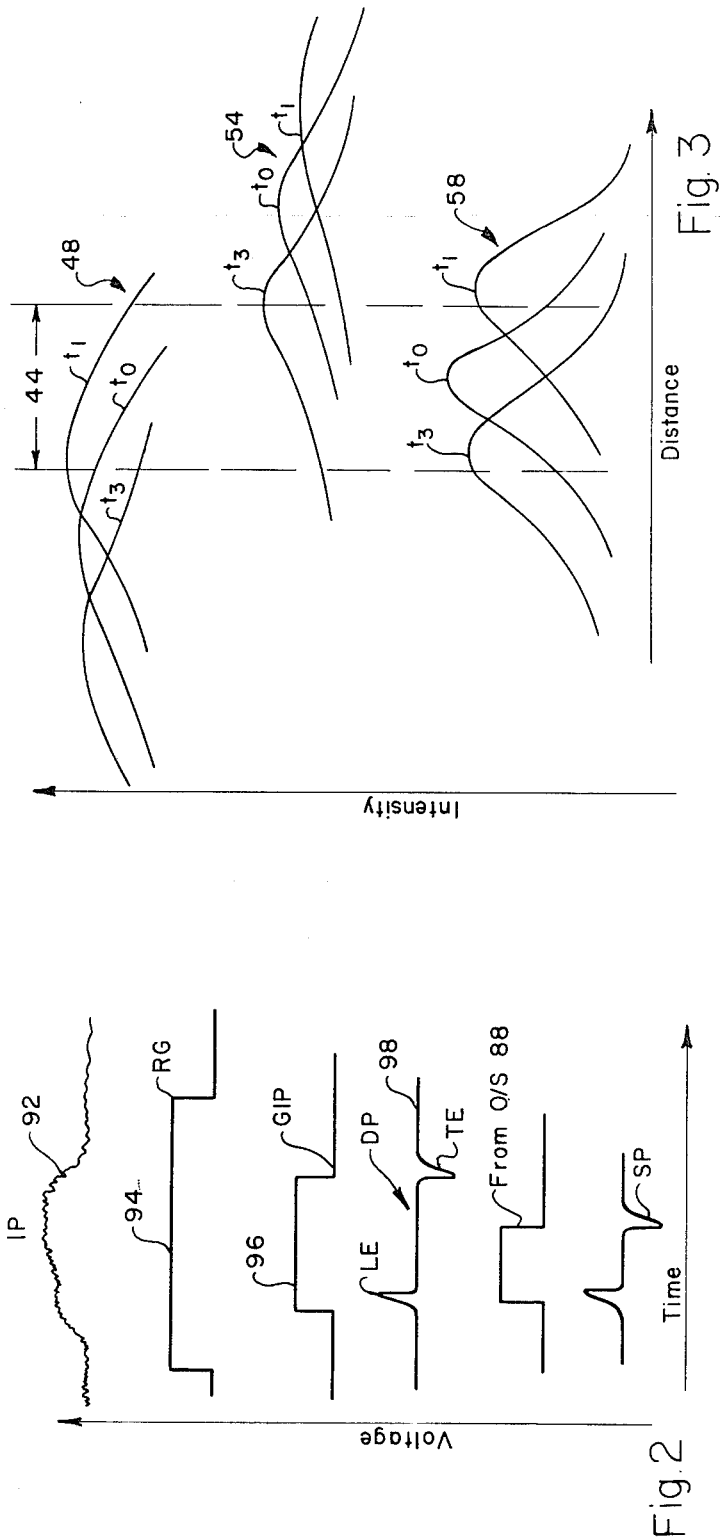

RETURN-WAVE, PHASE CONTROLLED ADAPTIVE ARRAY

The invention claimed herein was made in the course of or under a contract or subcontract thereunder, with the United States Air Force.

BACKGROUND OF THE INVENTION

This invention relates generally to adaptive arrays; and more particularly to such arrays wherein the phase shifters in each of a plurality of subaperture channels are controlled in response to the phase relationship sensed by means of spatial modulation of received signals, so as to establish an in phase condition for the transmitted energy at the target.

The distribution of electromagnetic energy radiated by an aperture emerged in the atmosphere differs from the ideal diffraction limited behavior (assumes a vacuum) due to refractive index variations across the beam — resulting from atmospheric density variations, for example. Among the principle sources of density variations are atmospheric turbulence and heating due to absorption of the radiated energy. The performance of very narrow beam width (large aperture) coherent systems, for example laser systems, is seriously degraded by atmospheric turbulence, and also in some cases by variations in the propagation time of the signal for different sections of the beam due to variations in parameter values of system components. Three types of problems relating to nonuniform and/or time varying propagation time across a large aperture transmitting system are:

The width of the main lobe of the radiation pattern is increased, thereby reducing resolution capability and power on target;

The direction of the main radiation beam deviates in a time-varying manner; and

The shape of the overall radiation pattern, including side lobes, becomes irregular and time varying.

It is possible to reduce the adverse effects of the atmosphere on the radiation pattern of a large aperture system by utilizing instead, an array of smaller aperture (subapertures) whose phase is adaptably controlled. If each of the individual elements of the array are small enough that their radiation pattern is diffraction limited; then near diffraction limited performance from the entire array may be obtained by adaptively changing the relative phase relationship associated with the various subaperture channels in such a manner as to compensate for nonuniformities which may exist between various portions of the beam.

One adaptive compensation technique uses the phase difference between signals from multiple receiving channels, as determined by phase comparison of the received signal with the optical carrier frequency (after heterodyne conversion), to provide the required phase adjustments for the transmitted beam. Although this approach, sometimes referred to as the phase-conjugate technique, may be a marked improvement over nonadaptive systems, it does have numerous disadvantages. One of the main disadvantages is the requirement of a phase and gain matched heterodyne detector receiving system in each subaperture channel. In certain applications a single system may comprise hundreds of subaperture channels; and in such instances the phase and gain tracking heterodyne detector requirements of the phase-conjugate approach could be economically unfeasible. Additionally, in applications where targets of high doppler signatures are involved, mechanization difficulties inherent with gain and phase tracking heterodyne channels are further accentuated.

Copending application Ser. No. 128,628, filed Feb. 24, 1971, by the inventor of the subject invention and assigned to a common assignee, describes a corrective system which compensates for phase distortion across the beam by operating with a multidither, adaptive, phase-correcting control loop closed "around" the target. In this system, the feedback control signal which measures the phasing errors on the outgoing path of the transmitted beam, is sensed by a time modulation contained in the received signal reflected from the target. Although it is believed that this system will perform quite well for cases where the atmospheric rate of change "effective" time constant is less than the round trip propagation time; there are numerous system applications involving targets at extreme ranges where just the reverse is true. It is noted that "the effective time constant" may be much greater than the natural constant because of rapid beam slewing or source or target-generated turbulence, for example. Consequently, for long range applications, systems which measure phase errors on the outgoing (transmission) path may produce phase compensation information which is too late to correct for current atmospheric conditions.

SUMMARY OF THE INVENTION

It is therefore an object of the subject invention to provide the system and method for adaptive phase control of energy transmitting and receiving arrays which are suitable for applications involving targets at extended ranges.

Another object of the subject invention is to provide an improved, cost effective, array of subapertures channels which are adaptively controlled as a function of the relative phase distribution of received signals as sensed by means of spatial modulation of the received signals in various subaperture channels.

A further object is to provide an adaptive array system which senses and compensates for relative phase disturbances of signals processed by a plurality of subaperture channels, without requiring phase-matched, multi-channel, heterodyne receiving subsystems.

The subject invention relates to the system and method for controlling the relative phase of a plurality of subaperture channels of a main radiating aperture or telescope so as to maximize the radiated energy at a target. In accordance with one preferred embodiment of the invention, the received energy in selected subaperture channels is phase modulated at different frequencies or with different waveforms, and is then focused through the aperture of an image plane stop structure onto a detector. The stop aperture is approximately the size of a diffraction limited spot at the image plane and the phase modulation of the received energy produces spatial modulation of the received beam with respect to the stop aperture; thereby generating modulation components in the detector's output signal which are indicative of the relative phasing errors associated with each of the subaperture channels. Since the received energy processed by each of the subaperture channels is characterized (tagged) by its own signature — i.e., its phase dither frequency, for example, — separation of the modulation components into control signals each of which is associated with one and only one subaperture channel may be readily implemented without requiring heterodyne detection or complex computations. These modulation components are used to control variable phase shifters disposed, respectively, in the common transmission and reception paths of the selected subaperture channels such that the received focused image is centered in the aperture of the image plane stop and the image spread is reduced to a minimum. Since the transmitted energy is also applied through the phase compensating variation phase shifters, the transmitted signal is thereby corrected for phase errors associated with disturbances sensed by the received signal and hence maximum energy is applied at the target.

BRIEF DESCRIPTION OF THE DRAWINGS

The novel features of this invention, as well as the invention itself, will be better understood from the accompanying description taken in connection with the accompanying drawings in which like reference characters refer to like parts and in which:

FIG. 2 is a graph of voltage versus time waveforms for explaining the operation of the signal processing portion of the system of FIG. 1;

FIG. 3 depicts the intensity distribution of received energy at an image plane structure of FIG. 1;

FIG. 5 is a simplified block diagram of a portion of the system of FIG. 1, for further explaining the principles of operation of the invention.

DESCRIPTION OF THE PREFERRED EMBODIMENTS

Figure 1:
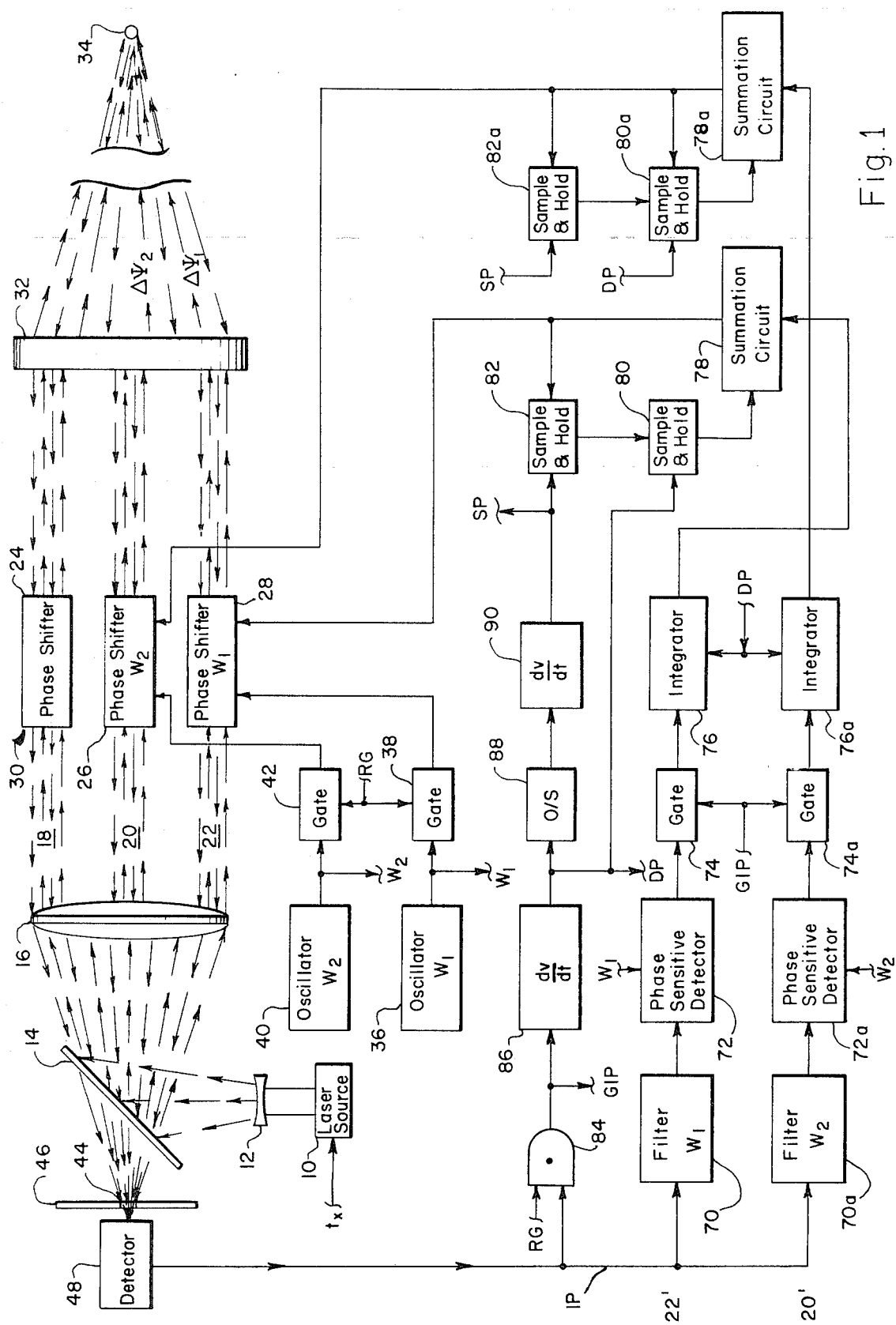
FIG. 1 is a block diagram of a laser transmitting and receiving system in accordance with the principles of the subject invention, wherein an array of subaperture channels are adaptively controlled so as to deliver maximum energy at a target.

Considering first the adaptively controlled energy transmission and reception system of FIG. 1, a laser source 10 provides an output energy pulse, which is shaped by a lens 12, reflected from a beam splitter 14, collimated by lens 16, and then applied to subaperture channels 18, 20 and 22. Laser source 10 is synchronized by a trigger pulse ($t_x$) applied from a control console (not shown).

Subaperture channels 18, 20 and 22 each include an electronically controllable phase shifter device designated 24, 26 and 28, respectively; with the array of the phase shifting devices being designated generally by reference numeral 30. In the interest of clarity of the explanation, only three subaperture channels are illustrated with channel 18 being used as a reference and channels 20 and 22 as controlled channels; however, it should be understood that in a typical system there might be hundreds of controlled channels. Phase shifter 24 in reference channel 18 is not electronically controlled; but is included to maintain uniformity of the subaperture channels and thus reduce phase variations between the various channels due to such causes as temperature effects.

The electronically controllable phase shifter devices could comprise a two-dimensional array of electrooptical rods, with each rod being disposed within a particular subaperture channel. The electro-optical rods could be constructed, for example, of Cadmium Tellurium (Cd Te); and for a 3.5 micron system, rods approximately 2 centimeters in length, would provide a phase shift of 180° in response to approximately 750 volts applied thereto. Alternatively, the electrically controllable phase shifters may be implemented by means of electro-mechanically driven mirror arrangements, which are well known in the art.

The output beams from phase shifter array 30 are applied to corresponding subaperture sections of a telescope 32, which may be of the Cassegrain type; and then radiated towards a target 34.

A portion of the energy reflected from target 34 is received by telescope 32 and applied through phase shifter array 30. However, during the reception mode of operation a phase modulation (dither) is applied to all but one of the phase shifters comprising array 30; and each phase shifter is modulated at a distinctly different frequency, or with a distinctly different waveform. As shown in FIG. 1, an oscillator 36 provides a voltage signal at a frequency $\omega_1$, through a gate 38, to electronically controllable phase shifter 28; and an oscillator 40 provides a voltage signal at a frequency $\omega_2$, through a gate 42, to electronically controllable phase shifter 26. Gates 38 and 42 are controlled by a range gate (RG) signal such that the phase modulation driving signals (hereinafter sometimes referred to as $\omega_1$ and $\omega_2$ signals) are applied only during the approximate period of reception of the reflected energy from target 34. The range gate signal is applied from a ranging subsystem (not shown). It is noted that although it is not necessary that the output signals from oscillators 36 and 40 be gated by a range gate signal, it is preferable in long range systems that modulation driving signals ($\omega_1$ and $\omega_2$) not be applied to the electronically controllable phase shifters during the transmission period. The magnitude of the signals $\omega_1$ and $\omega_2$ are selected such that signals applied through phase shifters 28 and 26 are phase modulated at low index (approximately ±30° to ±60°, for example).

During the reception mode, the output signals from phase shifter array 30 are applied through lens 16 and beam splitter 14; and that portion of these signals which pass through an aperture 44 of an image plane stop structure 46, impinge upon a detector 48. The aperture 44 is approximately the size of a free-space diffraction — limited spot as imaged at the plane of structure 46.

Reference is now directed to FIG. 3 which depicts the intensity of the received energy at the plane of structure 46, for various phase relationships of the received signal. In order to simplify the discussion relative to FIG. 3, it will be assumed that only the energy processed through subaperture channels 18 and 22 is involved; with the signal from subchannel 18 being considered the reference and the signal from channel 22 as being the modulated or "tagged" portion of the image formed at plane 46. It will be understood, however, that in the actual operation of the subject invention any number of modulated subaperture channels may be operated simultaneously.

Figure 4:
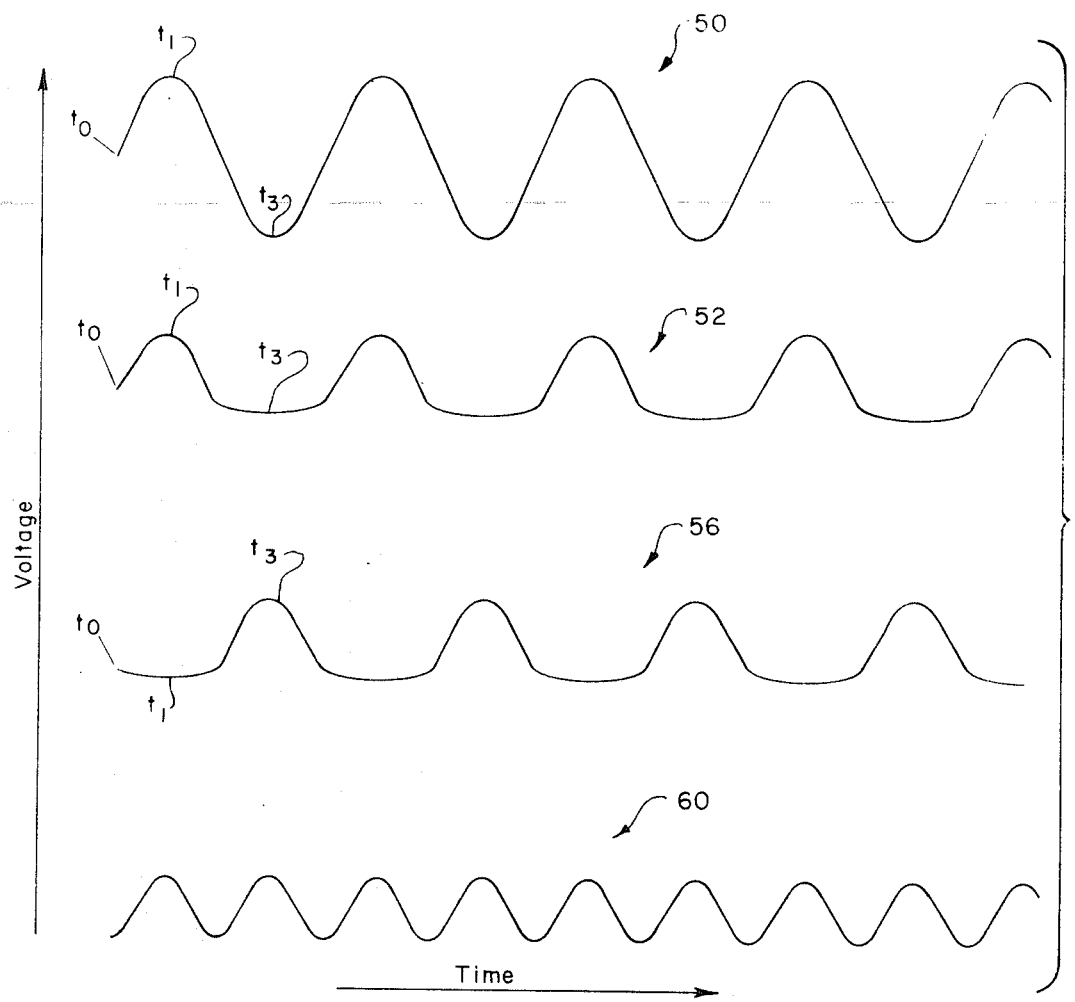
FIG. 4 illustrates the phase modulation driving signal for a selected subaperture channel and detector output signals resulting from the phase modulation, for explaining the operation of the invention.

A waveform designated generally by reference numeral 48 in FIG. 3, illustrates the intensity distribution of the image at plane 46 for various phasing relationships of the signals forming the image. A waveform 50 of FIG. 4 depicts the modulation voltage $\omega_1$ applied to electronically controllable phase shifter 28 of subaperture channel 22. At time $t_o$ with respect to the modulation voltage, the intensity distribution curve labeled $t_o$ in waveform 48 illustrates the phasing situation where initially the image is offset to the left of aperture 44. If a positive phase modulation voltage applied to array 30 causes the image, as depicted in FIG. 3, to be transposed to the right, then during the first half cycle of the modulation signal $\omega_1$, the image is translated such that more energy passes through aperture 44, with the peak intensity occurring at time $t_1$. The relationship between the image and the aperture 44 at time $t_1$ is depicted in waveform 48 by the intensity distribution curve designated $t_1$. Similarly, during the second half of the waveform $\omega_1$, the image is transposed to the left with the maximum displacement being as illustrated by the intensity distribution curve labeled $t_3$ in waveform 48 of FIG. 3.

The magnitude of the output signal from detector 48 corresponding to the phasing relationship just described for waveform 48 of FIG. 3 is shown by a waveform 52 of FIG. 4. It will be observed from waveform 52 that the output signal increases in intensity until the peak positive excursion of the image is reached at time $t_1$ and the output signal then decreases in intensity until it approximates its null condition shortly after time $t_2$.

The situation where the image is initially (no applied phase modulation) offset to the right of aperture 44 is illustrated by a waveform 54 of FIG. 3; and the output signal from detector 48 associated therewith is shown by a waveform 56 of FIG. 4. As shown by waveform 54 of FIG. 3, the image is translated from its position to the right of aperture 44 at time $t_o$, to a maximum displacement to the right at time $t_1$ during the positive half cycle of modulation voltage $\omega_1$. During the negative half cycle of modulation voltage $\omega_1$, the image is translated to the left with the maximum signal displacement in this direction occurring at time $t_3$.

It is noted from waveforms 52 and 56 of FIG. 4 that the signal depicted in both of these waveforms has a strong energy content at the modulation driving signal frequency $\omega_1$; that the signal associated with waveform 52 is in phase with the modulation driving signal; and that the signal associated with waveform 56 is out of phase with the reference signal.

Curve $t_o$ of waveform of FIG. 3 illustrates the situation where initially (without phase modulation) the image at plane 46 is focused, and hence is substantially centered in aperture 44 and exhibits a narrow, peaked intensity distribution. During the positive half cycle of modulation drive signal $\omega_1$ the image is translated to the right as illustrated by intensity distribution curve $t_1$; and during the negative half cycle the image is translated to the left as illustrated by curve $t_3$ of waveform 58. For the situations illustrated by waveform 58, the output signal from detector 48 is shown by a waveform 60 of FIG. 4. It will be noted from waveform 60 that for the case of a focused received image the variations in the output signal from detector 48 are at twice the frequency of the modulation driving sinal (e.g., $2\omega_1$), and that there is very little energy content at the frequency of the modulation driving signal (e.g., $\omega_1$).

Hence, detector 48 (FIG. 1) provides output signals which are indicative of not only the magnitude of the phase error of a given subaperture channel but also of the polarity (positive or negative) of the phase error. The polarity of the phase error is indicated by the relative phase of the detector signals with respect to the modulation driving voltage (e.g., $\omega_1$) — compare waveform 52 and 56. Further, the focused condition may be sensed by not only observing that the output signal from detector 48 has minimum energy content at the modulation driving frequency; but also by an increase in the modulation component at twice the modulation driving frequency.

FIG. 5 shows a portion of the system of FIG. 1 for further explaining the operation thereof. In FIG. 5 the energy reflected from target 34 undergoes differential propagation delays (as compared to the signal associated with subaperture channel 18) near telescope 32; and resulting distortions associated with the portions of the beam processed by subaperture channels 22 and 20 are designated $\Delta\psi_1$ and $\Delta\psi_2$, respectively. It is noted that the portion of the beam processed by subaperture channel 18 is used as a "phase reference." For proper focusing of the target image at image plane stop structure 46, electronically controllable phase shifters 26 and 28 must be adjusted for equal and opposite phase values from those introduced by the disturbances. Hence, when the values of phase shifters 28 and 26 are set to $\Delta\psi_1$ and $\Delta\psi_2$, which are equal to the negative of the value of phase distortion $\Delta\psi_1$ and $\Delta\psi_2$, respectively, the image will be focused on aperture 44. In FIG. 5 the reflectivity characteristics of target 34 are depicted by a waveform 62 as having points of maximum reflecivity (glint points) designated 62a, 62b, 62c and 62d. The energy distribution at image plane 46 for the case where the portions of the beam associated with the various subaperture channels are not properly phased compensated by phase shifter array 30, i.e., $\Delta\phi_k \neq -\Delta\psi_k$, is illustrated by dashed contour 64. The energy distribution for the situation where $\Delta\phi_k = -\Delta\psi_k$, i.e. the beam is compensated and focused, is illustrated by solid contour line 66. It is noted that each of the glint points of target 34 has an associated intensity distribution at image plane 46 and that any one of these points may be used for the operation of the control system as described herein. Hence, although during the discussion of FIGS. 3 and 4 it was assumed that the received energy was from a very small discrete target, the operation of the system as there described is equally applicable to a distributed target having glint points which, in the operation of the subject invention, are functionally equivalent to small discrete targets.

Again referring primarily to FIG. 1, the output signal from detector 48 is applied in parallel to subaperture processing and control channels indicated by the same reference numeral as the associated subaperture channel with the addition of a prime superscript thereto. Subaperture processing and control channel 22' comprises a passband filter 70 centered at $\omega_1$, a phase sensitive detector 72, a gate 74, an integrator 76 and a summation circuit 78. The phase sensitive detector produces an output signal which is a function of the magnitude of the input signal applied thereto and of the phase angle between the input signal and a reference signal. The output signal from filter 70 (at frequency $\omega_1$) is compared in phase sensitive detector 72 with the modulation drive signal $\omega_1$ applied from oscillator 36. The output signal of detector 72 is indicative of the magnitude and direction of the phase error of subaperture channel 22, and is applied through gate 74 and integrator 76 to summation circuit 78. A second input signal to summer 78 is applied from a sample and hold circuit 80; and circuit 80 is updated from a second sample and hold circuit 82.

Timing signals for the control and processing subchannels 20' and 22' are provided by a circuit arrangement which comprises an AND gate 84, a differentiator circuit 86, and monostable multivibrator (sometimes herein referred to as a one shot, O/s) and a second differentiator circuit 90. In operation of the just described circuit arrangement for providing timing signals, the output signal from detector 48 is applied to AND gate 84 in conjunction with a range gate signal so as to produce a gated image pulse at the output of AND gate 84. The image pulse (IP), the range gate (RG) pulse and the gated image pulse (GIP) are illustrated by waveforms 92, 94 and 96, respectively, of FIG. 2. Circuit 86 (FIG. 1) differentiates the gated image pulse to produce a positive going pulse designated LE at the leading edge thereof; and a negative going pulse designated TE at the trailing edge thereof. Monostable multivibrator 88 is responsive to the leading edge (LE) pulse and is triggered thereby to generate an output pulse (see waveform 100 of FIG. 2) having a fixed time duration slightly less than the minimum width of the image pulse — as determined by the width of the transmitted pulse. The output signal from monostable multivibrator 88 is processed through differentiator circuit 90 and the negative going pulse at the output thereof (designated SP for sample pulse) is applied to sample and hold circuit 82. Upon the occurrence of the sample pulse, circuit 82 samples and stores the value at the output circuit of summer 78. The output signal from differentiator 86 is also applied to sample and hold circuit 80 and in response to the negative pulse (TE), sample and hold circuit 80 is updated to the value held by circuit 82. Gate 74 is enabled by the gated image pulse (GIP) produced by AND gate 84, and integrator 76 is cleared (set to its null condition value) by the negative portion (TE) of the pulse from differentiator 86.

To summarize the operation of the processor and control channel 22', modulation signal component at frequency $\omega_1$ are applied from detector 48 through filter 70 to phase sensitive detector 72; and during the gated image pulse period the output voltage from phase detector 72 is integrated within circuit 76. The output signal from integrator 76 is combined in summer 78 with the signal stored in sample and hold circuit 80 from the previous reception processing cycle. Hence, the signal at the output of summer 78 is the proper value of control signal to provide a phase correction ($\Delta\phi_1$) to subaperture channel 22.

During the first portion of the received pulse on the current reception period, if a phase error exists, the modulation of phase shifter 28 at frequency $\omega_1$ will produce modulation components at that frequency. These modulation components are applied through processing and control channel 22' so that before the reception period is terminated the output voltage from summer 78 is such that $\Delta\phi_1$ is equal to a $-\Delta\psi_1$ (see FIG. 5). Further, before the termination of the received pulse, sample pulse (SP) triggers sample and hold circuit 82 such that the correction value then at the output of summer 78 is held therein. Shortly thereafter and coincident with the trailing edge (TE) of the gated image pulse, the stored value from sample and hold circuit 82 is applied to circuit 80 where in it is stored until updated during the following correction cycle.

Control and processing channel 20' is functionally identical to the just described channel 22'; and corresponding elements of channel 20' are given the same reference numeral designation as their counterparts in channel 22' with the addition of a postscript "a."

It is important to recall that one of the primary objects of the subject invention is to adjust the phase of the various subaperture channels such that the transmitted energy is a maximum at the target. It will now be evident that during the transmission periods each of the subaperture channels will have been adjusted to the correct phase value to compensate for the phase perturbations encountered in the atmosphere adjacent to telescope 32, for example. The transmission pulse may occur as soon as the processing transients have terminated (shortly after the TE pulse); and hence the settings of the phase shifter array 30 will still be current- i.e., the corrections are sensed sufficiently close to the transmission period that phase shifter array 30 adequately compensates for disturbances encountered by the transmitted signal.

Figure 6:
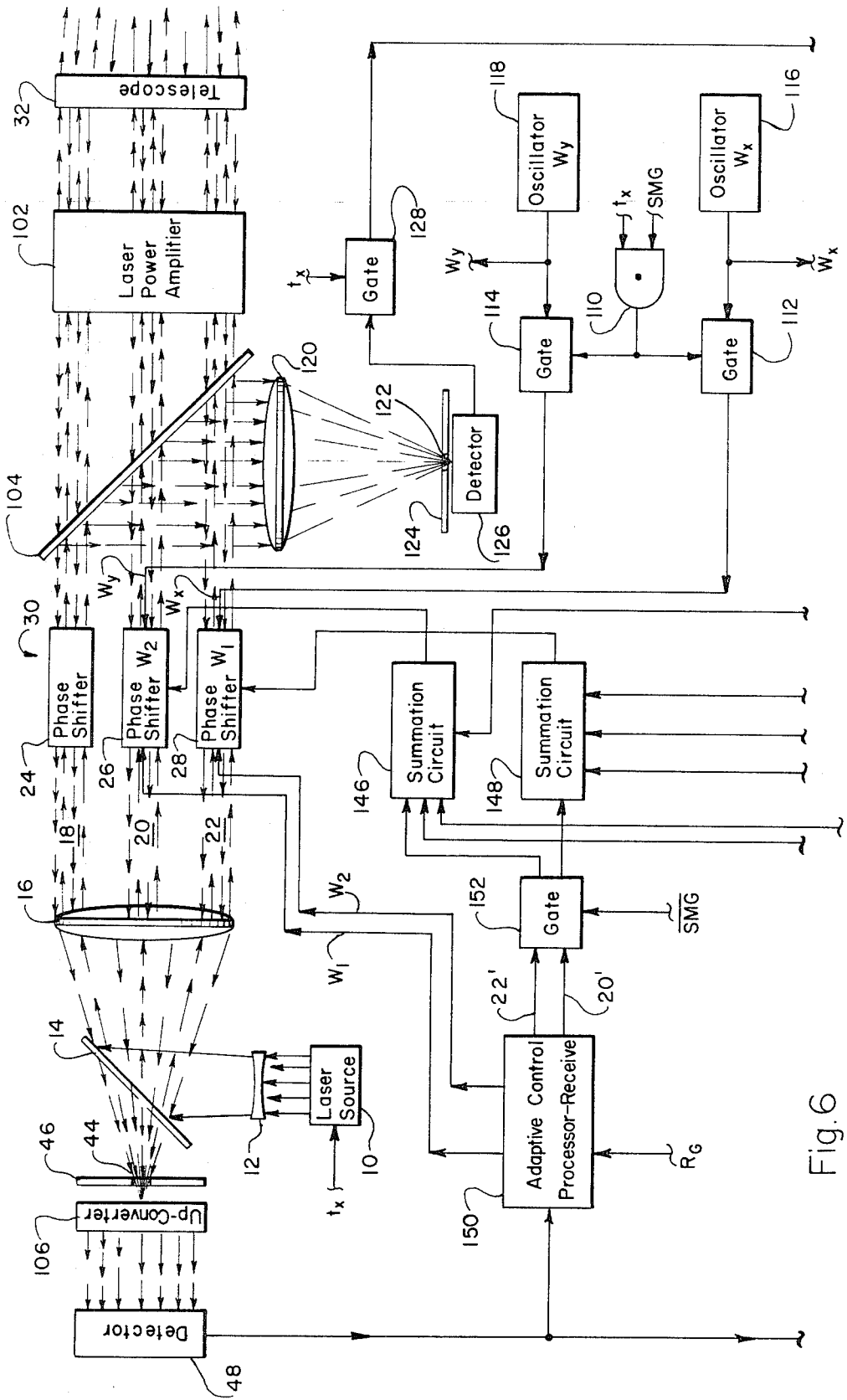
FIGS. 6 and 6a are block diagrams of a second embodiment of a laser transmitting and receiving system in accordance with the subject invention, wherein acquisition modes are implemented for aiding in initially illuminating a designated target.
Figure 6A:
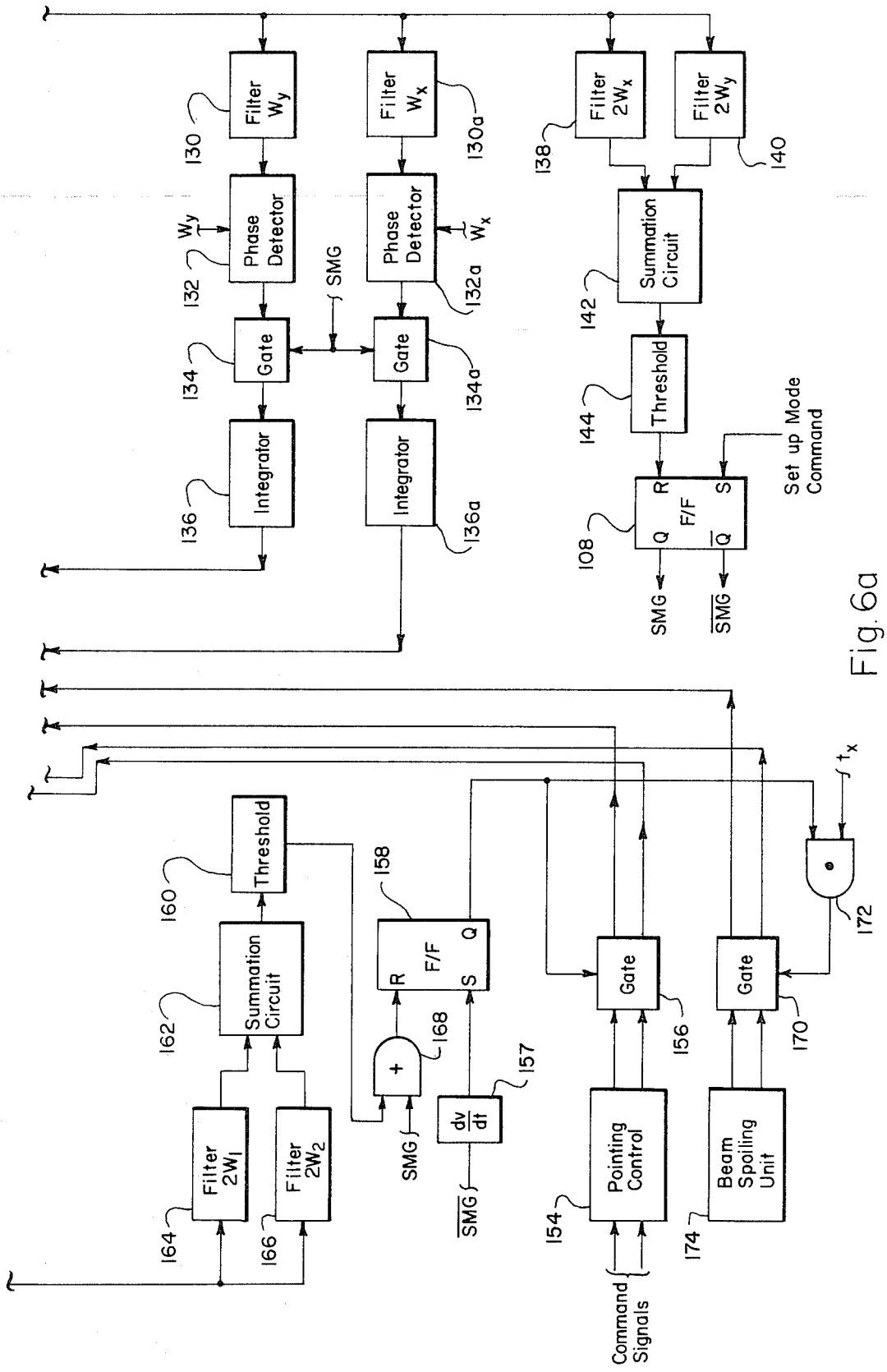

A second preferred embodiment of the subject invention is shown in FIGS. 6 and 6a to which reference is now primarily directed. Elements and/or assemblies which perform functions corresponding to those described relative to FIG. 1 have been assigned the same reference designation. For example, the main optical transmission and reception path shown in the upper part of FIG. 6 corresponds to that described with respect to FIG. 1, with the exception of a laser power amplifier 102 added between the phase shifter array 30 and telescope 32; and a second beam splitter designated 104, is located between array 30 and power amplifier 102. Also a range gated parametric upconversion (frequency) amplifier is disposed between image plane stop structure 46 and detector 48. The function of up-converter 106 is to increase the detection efficiency, as well as provide isolation for detector 48 during the transmission period.

The primary functional distinction between the embodiment of FIGS. 6 and 6a and the embodiment FIG. 1 is that in the system of FIGS. 6 and 6a an acquisition mode is implemented for aiding in initially illuminating a designated target. The acquisition mode is initiated by the application of a setup mode command signal pulse applied to the set input terminal of a flip-flop 108 (lower center of FIG. 6a). In response thereto flip-flop 108 produces a set mode gate (SMG) signal at the Q output terminal thereof. The SMG signal is logically combined with the transmission synchronization pulse $t_x$ in an AND gate 110 (lower right side of FIG. 6) and the output signal therefrom energizes gates 112 and 114. When energized gate 112 applies a phase modulation signal at a frequency $\omega_x$ to electronically controllable phase shifter 28; and when energized gate 114 applies a phase modulation signal at a frequency $\omega_y$ to electronically controllable phase shifter 26.

The effect of modulation signals $\omega_x$ and $\omega_y$ on the operation of phase shifter array 30 is similar to that of signals $\omega_1$ and $\omega_2$ discussed hereinabove relative to the reception period. However, it is noted that signals $\omega_x$ and $\omega_y$ are applied only during the transmission period to cause phase shifter array 30 to produce a spatial modulation of the transmitted beam. The spatially modulated transmitted beam is reflected from beam splitter 104, and is focused through lens 120. Lens 120 is situated such that if a plane wave (no phase distortion) were incident thereon the beam therefrom would be centered in an aperture 122 of an image plane stop structure 124. If the incident beam is not properly focused the output signal from a detector 126, disposed behind stop structure 124, contains modulation components at frequencies $\omega_x$ and $\omega_y$. These last mentioned modulation components result from the spatial modulation of the beam across the aperture 122 in accordance with the same principles discussed above relative to FIGS. 3 and 4.

The output signal from detector 126 is applied through a gate 128 to an input terminal of a passband filter 130 centered at frequency $\omega_y$. Gate 128 is enabled by the transmit synchronization pulse $t_x$, and hence the following processor circuits are enabled only during the transmission time period. The output signal from filter 130 is indicative of the phase error associated with the portion of the beam from phase shifter 26; and it is processed within a phase sensitive detector 132 against the reference signal $\omega_y$. The output signal from detector 132 is applied through a gate 134 to an integrator 136; and the output from integrator 136 is applied through summation circuit 146 to phase shifter 26.

A second channel processes components of the output signal from detector 126 which are at the frequency $\omega_x$, so as to provide a control signal for electronically controllable phase shifter 28 in an identical manner to that just described with respect to phase shifter 26. Corresponding elements of this second channel have been assigned reference numerals corresponding to like elements of the "$\omega_y$" processing channel, but with the postscript "a" added thereto. For example, input passband filter 130a passes signals at the frequency $\omega_x$, and phase sensitive detector 32a detects the filtered signals against a reference at frequency $\omega_x$.

The output signals from detector 126 are also applied in parallel to passband filters 138 and 140 which have their passbands at frequency $2\omega_x$ and $2\omega_y$, respectively. The output signals from filters 138 and 140 are combined in a summation circuit 142 and then applied to a threshold device 144. When the output signal from summation circuit 142 exceeds a preselected threshold level, circuit 144 applies a reset signal to flip-flop 108, thereby ending the setup portion of the acquisition mode.

The function of the above-described processing circuits associated with the output signals from detector 126, is to compensate for phase distortions that may initially be present in the system — such as, for example, those caused by temperature effects prior to temperature stabilization of array 30. This compensation is accomplished by the output signal from integrator 136, which is applied through summation circuit 146, to control the phase of electronically controllable phase shifter 26; and by the output signal from integrator 136a which is applied through summation circuit 148 to phase shifter 26. In a manner similarly to that described hereinabove relative to FIGS. 3 and 4, when the proper phase corrections have been applied to the individual subaperture channels associated with the various phase shifters of array 30, the beam applied to image plane stop structure 124 will be centered in aperture 122 and the modulation content of the output signal from detector 126 will be primarily at the second harmonic of modulation sources 116 and 118. These second harmonic signals are sensed by threshold circuit 144 and are used to control flip-flop 108 so as to terminate the setup mode. Integrators 136 and 136 a, which control array 30 in response to the correction signals developed during the setup mode, have discharge time constants such that the correction voltages slowly discharge. This avoids transient problems between operational modes.

During normal operation of the system shown in FIGS. 6 and 6a the relative phase of the subaperture transmitting and receiving channels is controlled in response to signals applied from adaptive control processor unit 150 in accordance with the description of channels 20' and 22' of FIG. 1. For example, the output signal from channel 20' (summation circuit 78a of FIG. 1) is applied through summation circuit 148 to phase shifter 26; and the output signal from processing channel 22' (summation circuit 78 of FIG. 1) is applied through summation circuit 146 to phase shifter 28. In the embodiment of FIG. 6, the output signals from the adaptive control processor 150 are processed through a two-channel gate 152. Gate 152 is enabled by the $\overline{Q}$ output signal from flip-flop 108 (FIG. 6a) so that the control of processor 150 is not effective during the setup phase of operation.

The acquisition of a designated target is aided by means of pointing control of the transmitted and received beam during the period following the setup mode but prior to when the received image is focused under the control of processor 150. Pointing control is implemented by unit 154 (FIG. 6a) which applies individual phase control signals (from a command source, not shown) to the electronically controllable phase shifters of array 30. The signals from pointing control unit 154 are applied through a two-channel gate 156 and summation units 146 and 148 to the associated phase shifter elements of array 30. Two-channel gate 156 is controlled by a signal applied from the Q output terminal of a flip-flop 158; and in response thereto the control signals from unit 154 are applied at the output of gate 156 during the time period between the end of the setup mode and the start of the normal operating mode. During the normal operating mode focusing of the received images is achieved by processor 150, and the value of phase control developed during the reception period is also maintained during transmission. Flip-flop 158 is set in response to the leading edge of the signal $\overline{SMG}$ (end of setup mode) as indicated by the positive pulse from differentiator 157; and is reset on the occurrence of either the setup mode command signal pulse (start of setup mode), or of an output signal from the threshold device 160 (focus of received image by processor 150 achieved). Threshold device 160 in conjunction with summation units 162 and filters 164 and 166 measure the second harmonic content in the output signal from detector 48. When the second harmonic content of the detector's output signal is indicative of a well formed received beam at image plane stop structure 46, threshold device 160 provides an output pulse through OR gate 168 to the reset terminal of flip-flop 158. Pointing control 154 is disenabled after the received image is properly focused inasmuch as the proper directional control will automatically result from the operation of processor 150, and pointing command signals are at this point no longer necessary.

Also, during the acquisition phase it may sometimes be helpful to defocus the transmitted signal in accordance with a preprogrammed pattern (a parabolic pattern, for example). This defocusing enlarges the transmitted beam and thereby the probability of radiating a designated target. In the embodiment of FIGS. 6 and 6a defocusing is applied to the transmitted beam by signals routed through two-channel gate 170 to summation circuits 146 and 148. The defocusing of the beam is limited to transmission intervals during the same time period that gate 146 is enabled. This is implemented in an AND gate 172 by logically combining the output signal from the Q terminal of flip-flop 158 with the transmission synchronization pulse ($t_x$).

Thus there has been described an improved cost effective energy transmission and reception system wherein an array of subaperture channels are adaptively controlled as a function of the relative phase distribution of received signals as sensed by means of spatial modulation of the received signals in various subaperture channels. Since along the outgoing transmission path the transmitted energy experiences approximately equal and opposite phase shifts from those applied by phase shifter array 30, the transmitted energy will be essentially in phase at the target. In the event that the sources of the phase distortions along the transmission path are well-confined to a region immediately in front of the radiating aperture, the power delivered to the target can approach the free-space or diffraction - limited beam power available from the system.

What is claimed is:

1. An energy transmission and reception system comprising:
   means for transmitting energy at a target;
   means for receiving a portion of the energy returned from the target;
   an image plane stop structure having an aperture formed therein;
   modulation means coupled in the reception path of said received energy for spatially modulating the received beam with respect to said aperture;
   detector means, disposed on the opposite side of said image plane stop structure from said modulation means, for producing output signals indicative of the intensity of the received energy passing through said aperture; and
   control means responsive to the output signals from said detector means, for adjusting the relative phase of selected segments of the received energy beam so as to cause the energy in the adjusted received beam to approach an in-phase condition.

2. The system of claim 1 wherein said modulation means includes means coupled in the reception path of said selected segments of the received beam for phase modulating, at different rates, respectively, the received energy in each of said selected beam segments, thereby producing in the output signal from said detector, modulation component signals at frequencies corresponding to the phase modulation rates of the respective segments of the received beam; and said control means includes means for processing said modulation component signals to produce phase control signals indicative of the relative phase error of the respective selected segments of the received beam, and a plurality of electronically controllable phase shifters, with different ones of said electronically controllable phase shifters being disposed in the reception path of each of said selected segments of the received beam, and means for controlling each of said electronically controllable phase shifters in response to a different one of said phase shift control signals.

3. The system of claim 2 wherein said transmitting means includes means for transmitting pulses of energy; and said control means including means for storing the phase control signals produced during a given reception period and for updating said stored control signals during subsequent reception periods, and means for controlling the relative phase of the energy across the transmitted beam in response to said stored phase control signals.

4. The system of claim 2 wherein said control means includes a plurality of functionally separate processing channels, with each processing channel comprising a filter series coupled to a phase sensitive detector so as to provide said phase control signal as a function of the magnitude and relative phase of one of said modulation component signals.

5. The system of claim 1 further comprising:
   transmission modulation means for spatially modulating the transmission beam;
   a second image plane stop structure disposed relative to said transmission modulation means for receiving a portion of the transmitted energy therefrom, said second image plane stop structure having a second aperture formed therein;
   second detector means disposed on the opposite side of said second image plane stop structure from said transmission modulator means for producing output signals indicative of the intensity of the energy passing through said second aperture; and
   second control means responsive to the output signals from said second detector means, for adjusting the relative phase of selected segments of the transmission beam so as to cause the energy in the adjusted transmission beam to approach an in-phase condition.

6. The system of claim 5 further comprising:
   means for producing and storing transmit phase control signals indicative of the relative phase adjustments of said selected segments of the transmission beam implemented by said second control means;
   first threshold means, responsive to the output signals from said second detection means, for providing an inhibit signal when the phase variations across the transmission beam are within predetermined limits; and
   means, responsive to said inhibit signal for disenabling said transmission modulation means.

7. The system of claim 6 further comprising transition means for controlling, after said inhibit signal, the relative phase across the transmission beam as a function of the last stored transmit phase control signals, with said transition means including discharge-storage means for allowing the stored transmit phase control signal to decrease in accordance with a preselected program.

8. The system of claim 7 further comprising transmission defocusing means, enabled in response to said inhibit signal, for controlling the relative phase across said transmission beam such that said beam is defocussed in accordance with a preselected pattern.

9. The system of claim 8 wherein said transmission defocusing means includes a second threshold circuit, responsive to the output signals from said first detector means, for sensing when the phase across said adjusted received beam is within preselected limits; and logic means, responsive to the output signal from said second threshold circuit for inhibiting said transmission defocusing means.

10. The system of claim 9 further comprising beam pointing control means, enabled in response to said inhibit signal for controlling the direction of energy transmission and reception; and second logic means responsive to the output signal from said second threshold circuit for inhibiting said beam pointing control means.

11. An energy transmission and reception system comprising:
  means for transmitting energy at a target;
  means for receiving a beam of energy formed from transmitted energy returned from the target;
  modulation means coupled in the reception path of selected segments of the received beam for phase modulating, at different respective rates, the received energy in each of said selected beam segments;
  an image plane stop structure disposed in the reception path of said beam, and having an aperture formed therein;
  means for focusing the output energy from said modulation means at approximately the plane of said image plane stop structure;
  detector means, disposed on the opposite side of said image plane stop structure from said modulation means, for providing output signals indicative of the intensity of the energy passing through said aperture;
  a plurality of electronically controllable phase shifters with a different one of said electronically controllable phase shifters being disposed in a common transmission and reception path of each of said selected segments of the received beam; and
  control means responsive to the output signals from said detector means for providing phase control signals to said plurality of electronically controllable phase shifters so as to cause the relative phase of the received energy at the output of said electronically controllable phase shifters to have an approximately plane wave front.

12. The system of claim 11 wherein said means for focusing includes a lens disposed in said reception path following said plurality of electronically controllable phase shifters; and wherein said image plane stop structure is disposed in said reception path such that for plane wave front signals applied to said lens the output beam therefrom is approximately centered in said aperture.

13. The system of claim 12 wherein said phase modulation of the received beam causes, in the output signals from said detector means, modulation component signals at the frequencies of said modulating rates; and said control means includes processor means responsive to said modulation component signals for respectively controlling each said electronically controllable phase shifter as a function of the modulation component signal having a frequency corresponding to the phase modulating rate of the corresponding beam segment.

14. The system of claim 13 wherein said processor means includes functionally separate processing channels for controlling said electronically controllable phase shifters, with each processing channel comprising a filter series coupled to a phase sensitive detector so as to provide a phase control signal as a function of the magnitude and relative phase of the modulation component signal having a frequency corresponding to the rate of the phase modulation applied to a given beam segment, and means for applying said phase control signal to the electronically controllable phase shifter disposed in the path of said given beam segment.

15. The system of claim 11 wherein said transmitting means includes means for transmitting pulses of energy; and said control means including means for storing the phase control signals produced during a given reception period and for updating said stored control signals during subsequent reception periods, and means for controlling the relative phase of the energy across the transmitted beam in response to said stored phase control signals.

16. The system of claim 11 further comprising:
  transmission modulation means for spatially modulating the transmission beam;
  a second image plane stop structure disposed relative to said transmission modulation means for receiving a portion of the transmitted energy therefrom, said second image plane stop structure having a second aperture formed therein;
  second detector means disposed on the opposite side of said second image plane stop structure from said transmission modulator means for producing output signals indicative of the intensity of the energy passing through said second aperture; and
  second control means responsive to the output signals from said second detector means, for adjusting the relative phase of selected segments of the transmission beam so as to cause the energy in the adjusted transmission beam to approach in in-phase condition.

17. The system of claim 16 further comprising:
  means for producing and storing transmit phase control signals indicative of the relative phase adjustment of said selected segments of the transmission beam implemented by said second control means;
  first threshold means, responsive to the output signals from said second detection means, for providing an inhibit signal when the phase variations across the transmission beam are within predetermined limits;
  means, responsive to said inhibit signal for disenabling said transmission modulation means; and
  transition means for controlling, after said inhibit signal, the relative phase across the transmission beam as a function of the last stored transmit phase control signals, with said transition means including discharge-storage means for allowing the stored transmit phase control signal to decrease in accordance with a preselected program.

18. The system of claim 17 further comprising transmission defocusing means, enabling in response to said inhibit signal, for controlling the relative phase across said transmission beam such that said beam is defocused in accordance with a preselected pattern.

19. The system of claim 18 wherein said transmission defocusing means includes a second threshold circuit, responsive to the output signals from said first detector means, for sensing when the phase across said adjusted received beam is within preselected limits; and logic means, responsive to the output signal from said second threshold circuit for inhibiting said transmission defocusing means.

20. The system of claim 19 further comprising beam pointing control means, enabled in response to said inhibit signal for controlling the direction of energy transmission and reception; and second logic means responsive to the output signal from said second threshold circuit for inhibiting said beam pointing control means.

* * * * *